Figure 1:
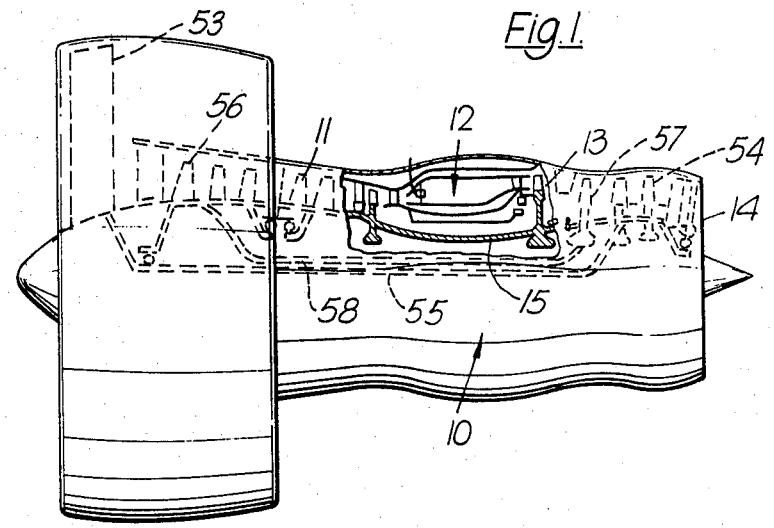

United States Patent [19]

Campbell

[11] 4,291,531

[45] Sep. 29, 1981

[54] GAS TURBINE ENGINE

[75] Inventor: David A. Campbell, Derby, England

[73] Assignee: Rolls-Royce Limited, London, England

[21] Appl. No.: 24,361

[22] Filed: Mar. 27, 1979

[30] Foreign Application Priority Data

Apr. 6, 1978 [GB] United Kingdom ............... 13422

[51] Int. Cl.³ .................. F02C 3/06; F02C 7/18
[52] U.S. Cl. .................. 60/39.51 R; 60/726; 60/751; 60/39.75
[58] Field of Search .......... 60/726, 727, 728, 751, 60/39.75, 39.51 R; 415/115, 116, 180, 117

[56] References Cited

U.S. PATENT DOCUMENTS

| 2,712,727 | 7/1955 | Morley et al. | 60/39.51 R |
|---|---|---|---|
| 3,034,298 | 5/1962 | White | 60/726 |
| 3,437,313 | 4/1969 | Moore | 60/751 |
| 3,742,706 | 7/1973 | Klompas | 60/726 |
| 3,751,909 | 8/1973 | Kohler | 60/39.75 |
| 3,826,084 | 7/1974 | Branstrom et al. | 415/115 |
| 3,980,411 | 9/1976 | Crow | 415/115 |

FOREIGN PATENT DOCUMENTS 2035423 7/1970 Fed. Rep. of Germany ........ 60/726

Primary Examiner—Robert E. Garrett
Attorney, Agent, or Firm—Cushman, Darby & Cushman

[57] ABSTRACT

A gas turbine engine comprises a compressor, a combustion system and a turbine, the compressor and the turbine being interconnected by a shaft. The combustion system has an initial diffusing section and duct means are provided to convey cooling air from at least part way down the diffusing section, to the turbine. At least one aperture is provided in the duct means and adapted to allow part of the cooling air to flow forwardly of the shaft on its outer surface to cool it.

9 Claims, 3 Drawing Figures

GAS TURBINE ENGINE

This invention relates to a gas turbine engine.

Modern gas turbine engines normally use a proportion of the air compressed by the compressor or compressors of the engine to cool the various hot parts downstream of the combustion chamber. In particular the first stage of turbine rotor blades is normally so cooled. It has been the practice to take this cooling air from the downstream extremity of the highest pressure compressor of the engine. It is convenient to do this because there is in any case a gap at this point between rotating and static structure, and the pressure of air is sufficiently high at that point to perform the necessary cooling function and to be able to be discharged into the hot gas stream of the engine. Additionally, the flow of cooling air provides a cooling effect on the shaft which connects the high pressure turbine with the high pressure compressor.

Because modern turbine cooling systems make considerable use of film cooling it is necessary that the cooling air should be at a high pressure. It is also essential that the cooling air should be as at as low a temperature as possible, i.e. it should preferably not have been used to cool any intervening structure such as shafts.

The present invention provides a gas turbine engine in which the cooling air is taken at a location where the pressure is higher than that at the downstream extremity of the compressor, and provision is still made to cool the adjacent shafting.

According to the present invention a gas turbine engine comprises a compressor, a combustion system and an air cooled turbine, the combustion system including an initial diffusing section for the air compressed by the compressor, the compressor and turbine being drivingly interconnected by a shaft, duct means adapted to convey cooling air from the main flow of the engine at a location at least part way along said diffusing section, to said turbine, and at least one aperture from said duct means adapted to allow part of said cooling air to flow forwardly round the outside of said shaft to cool it.

Preferably there is a gap between the downstream extremity of the rotor of said compressor and adjacent static structure, said part of said cooling air being allowed to rejoin the main airflow of the engine through said gap.

Thus in one embodiment the said portion of the cooling air is separated from the main body of cooling air adjacent said turbine and flows contra-flow to the initial direction of flow of the cooling air.

Said portion of the cooling air is preferably swirled by nozzles to give it approximately the same angular velocity of that of the shaft.

Figure 2:
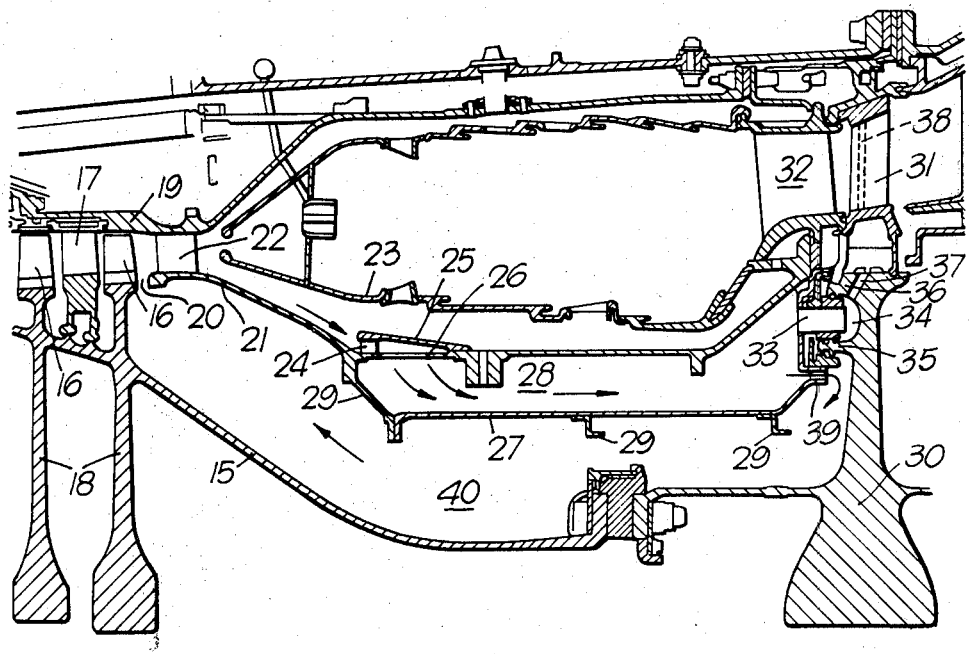
Figure 3:
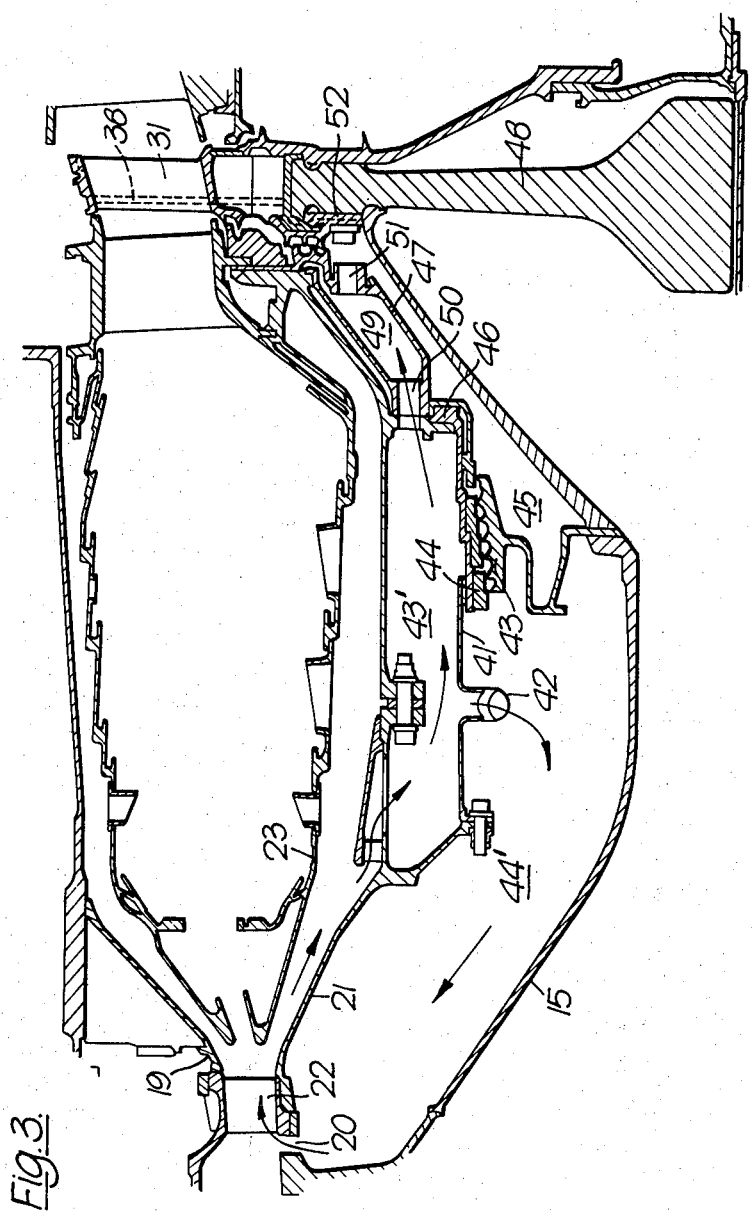

The invention will be particularly described merely by way of example with reference to the accompanying drawings in which:

FIG. 1 is a partly broken away side elevation of a gas turbine engine in accordance with the invention, FIG. 2 is an enlarged cross-section of the combustion section region of the engine of FIG. 1 and, FIG. 3 is a view similar to FIG. 2 but of a second embodiment.

In FIG. 1 there is shown a gas turbine engine of the fan type, comprising the usual fan driven by a core engine 10 which although described below as a single shaft core, may well be a two shaft core so that the whole engine is of the 'three-shaft' type. The core 10 comprises a compressor 11, combustion system 12, turbine 13 and final nozzles 14 all in flow series. The compressor 11 and the turbine 13 are connected by a drive shaft 15.

Overall operation of the core is conventional in that the compressor 11 takes in and compresses air previously acted on by a fan 53 which is then mixed with fuel and burned in the combustion section 12. The resulting hot gases drive the turbine 13 which in turn drives the compressor 11 by way of the shaft 15 and the residual hot gases drive the fan turbine 54 and flow through the nozzle 14 to provide propulsive thrust. The fan turbine drives the fan by way of a fan shaft 55 which passes through the hollow centre of the shaft 15.

Because the turbine 13 is subject to the effect of very hot gases from the combustion section 12 it is necessary to provide some form of cooling to the worst affected parts of the turbine. The cooling air necessary to carry out this function is taken from the air compressed by compressor 11, and in FIG. 2 it can be seen in more detail how this is carried out.

In FIG. 2 the downstream extremity of the compressor 11 is shown in greater detail and it may be seen that the compressor comprises the conventional interdigitated arrays of rotor blades 16 and stator blades 17. The rotor blades are carried from respective rotor disc 18 which are formed integrally with the drive shaft 15. The stator blades 17 are carried from a casing member 19. The downstream set of rotor blades 16 and rotor disc 18 form the downstream extremity of the compressor and a gap 20 is formed between this downstream extremity and an inner casing 21. A stage of outlet guide vanes 22 are supported between the casings 19 and 21 just downstream of the gap 20 and the last stage of rotor blade 16.

Downstream of the stage of outlet guide vanes 22 the casings 19 and 21 may diverge so as to form a diffusing section and so as to provide between them a relatively large space within which the combustion chamber 23 is supported. Because it is not relevant to the present invention the chamber 23 is not described in detail but it will be understood that this chamber is a fully annular type of combustion chamber.

The inner casing 21 is provided with an inlet 24 formed between an extension piece 25 and the cylindrical portion of the casing just downstream of the limit of its divergence. Air entering the inlet 24 is allowed to pass through apertures 26 to the inside of the casing 21. A second inner casing 27 is mounted spaced apart from the cylindrical portion of the casing 21. The second casing 27 is provided in this embodiment with stiffening rings 29 which prevents its going out of shape.

The annular chamber 28 provides a passage for the cooling air which flows through the intake 24 and apertures 26 and feeds this air inwardly of the engine towards the turbine 13.

The turbine 13 will be seen to comprise in the conventional manner a turbine disc 30 on which are retained a row of turbine rotor blades 31. Because the rotor blades 31 are exposed to the hot gases which issue from the combustion chamber 23 and through the nozzle guide vanes 32, it is necessary to provide cooling for the blades 31. In order to provide this cooling, the air passing down the chamber 28 is allowed to escape at the downstream end of the chamber through a series of swirl vanes 33 into a chamber 34 which is defined by flanges 35 and 36 from the disc 30 which seal with structure adjacent the swirlers 33. The swirlers 33 are designed to give the cooling air a similar angular velocity to that of the disc 30 as is well known in the art. Cooling air from the chamber 34 is then able to pass through passages 37 in the disc 30 and thus to the roots of the blades 31. The air may then enter a system of cooling passages 38 within each of the blades to provide cooling and a proportion will be exhausted through film cooling holes in the blade surface back to the gas stream of the engine. Once again these cooling passages are not illustrated in detail in this specification because their configuration is not of importance to the present invention.

Not all of the cooling air which enters the chamber 28 flows through the swirlers 33 to cool the blades 31. A proportion of the air, which will normally be a minor proportion is allowed to pass through a second set of swirlers 39 which are located just in-board of the flange 35; thus the swirlers allow air to pass into the chamber 40 which is formed between the second inner casing 27 and the drive shaft 15. This air flows in contra-flow to the direction of the air in the chamber 28, that is it flows from right to left in the drawing.

It should be noted that it would be possible to flow this proportion of the air through plain holes, or alternatively a proportion of the air swirled through the swirlers 33 could be used in its place.

The swirlers 39 are arranged to give the air the maximum possible angular velocity which is comparable to that of the shaft 15, and in its passage past the shaft, the air cools this structure.

It will be seen that the chamber 40 is completely sealed except for its entry formed by swirlers 39 and the gap 20 which forms an exit for the cooling air. The air therefore flows from the swirlers 39 to the gap 20 where it rejoins the main airstream of the engine.

It will be understood that because the outlet guide vanes 22 and the diffusing section formed between the casings 21 and 19 increase the static pressure of the air compressed by compressor 11, the pressure of the air at the intake 24 will be substantially greater than that at the gap 20. There is therefore sufficient pressure head to cause the circulation of the air from the intake 24 through the swirlers 39 and by way of the passage 40 to the gap 20. It will also be noted that the cooling air which passes through the swirlers 33 will be at a higher pressure than would be the case if the air were bled from the gap 20, and this together with the fact that the air has not been used to cool a shaft 15 means that the quality of the cooling air reaching the blades 31 is considerably improved.

FIG. 3 shows an alternative embodiment. The compressor 11 is of identical construction to that of FIG. 2 as is the combustion chamber 23, the outlet guide vanes 22, the casings 19 and 21, the shaft 15 and the turbine blades 31.

In this case, however, the second inner casing differs slightly from the casing 27 FIG. 2. In FIG. 3 an inner casing 41 is provided with preswirl nozzles 42 which allow a proportion of the air flowing along the chamber 43' to flow adjacent the shaft 15 and through the gap 20. A seal member 43 is carried from the shaft 15 and cooperates with a second seal member 44 carried from the second inner casing 41 to divide the area between the casing 41 and the shaft 15 into an upstream and a downstream chamber 44' and 45 respectively. The casing 41 terminates at a diaphragm 46 but a further casing 47 extends to adjacent the turbine disc 48 to provide a passage 49 which is in fact a continuation of the passage 43. Ducts 50 allow cooling air to pass from the passage 43 to the passage 49 and swirlers 51 cause the cooling air from the chamber 49 to enter the downstream portion of the chamber 45. This portion of the chamber 45 is adjacent the disc 48 and passages 52 formed in the structure adjacent the disc allow this cooling air to enter the roots of the blades 31 and thus to feed the passages 38.

In this embodiment therefore although the principle of the operation is similar to that of FIG. 2, the provision of the seals 43 and 44 causes the cooling air passing through the swirl nozzles 42 to only cool the upstream part of the shaft 15 inbetween the compressor 11 and the seals 43 and 44. The downstream part of the shaft 15 is cooled by the small proportion of the air which enters the chamber 45 through the swirlers 51 and which then leaks between the seal members 43 and 44.

Once again it will be seen that this embodiment makes use of the high pressure air which has been diffused in the initial part of the combustion system, and it ensures that the cooling air used for the rotor blades has not previously been used for shaft cooling. In both embodiments the return of the shaft cooling air to the main engine air flow at the gap 20 reduces the engine cycle loss due to throttling in this secondary air flow.

There are a number of possible modifications which could be made to the embodiments shown above. In particular it should be noted that although a single stage turbine and a single spool gas turbine core have been described heretofore, it is quite possible to use this system on a multi-shaft engine which may have multi-stage compressors 11 and 56 and turbines 13 and 57, the turbine 57 driving the compressor 56 by a shaft 58. The shafts 15, 58 and 55, respectively, are coaxial with the shaft 15 which connects the high pressure compressor to the high pressure turbine being the outermost, the shaft 58 which connects the low or intermediate pressure compressor 56 with the low or intermediate turbine 57 being intermediate and with the shaft 55 which connects the fan 53 to the fan turbine 54 being the innermost. Indeed it may be more important on a multi-shaft engine to provide cooling for the shaft 15 from the outside of the shaft. In the case of a multi-shaft engine it will normally be preferable to also cool the shaft interconnecting the lowest pressure components. It should also be noted that although the inlet 24 formed by the member 25 represents a very efficient way of bleeding the necessary air, it will be possible to use a simpler structure such as plunged holes in the casing 21.

Again although the best advantage is obtained by using air just past the downstream extremity of the diffusing section, some advantage is still to be gained by taking the air at a point further upstream; thus the outlet guide vanes 22 perform a degree of diffusion and it may be convenient in some instances to bleed off the cooling air just downstream of these vanes.

Another possibility is that the cooling air supplied to the blades 31 could be divided into two portions, one at a high pressure and one at a low pressure, these different pressures being achieved by different treatment of the single mass of air.

It should also be noted that the air bled from the casing 21 could be allowed to flow in a plurality of separate tubes to the region of the turbine.

I claim:

1. A gas turbine engine comprising:

a compressor, combustion system, and turbine in flow series, adjacent static structure defining a compressor discharge duct positioned directly between a downstream extremity of said compressor and an upstream extremity of said combustion system, said compressor discharge duct having at least a portion thereof spaced from said compressor to define a gap therebetween, a shaft drivingly interconnecting said compressor and said turbine, said combustion system having an initial diffusing section serving to diffuse air compressed by said compressor, duct means having an inlet arranged at a location at least part way along said diffusing section and an outlet to said turbine, said duct means conveying cooling air from the main flow of the engine and discharging a first part of said cooling air through said outlet to said turbine without cooling intervening structure of a combustion chamber, and at least one aperture from said duct means to discharge a second part of said cooling air around the outside of said shaft for forward flow along said shaft to cool the same and then be discharged through said gap directly into the compressor discharge duct and the main flow of air therein from said compressor for recirculation by the compressor air.

2. A gas turbine engine as claimed in claim 1 and in which each of said apertures in said duct means comprises a swirler for giving cooling air for said shaft a swirl in a direction of rotation of said shaft.

3. A gas turbine engine as claimed in claim 2 and in which each said swirler comprises a separate nozzle pointing in a direction to give the cooling air for said shaft a component of motion which is tangential with respect to the shaft.

4. A gas turbine engine as claimed in claim 2 and in which each said swirler comprises a passage between two angled vanes for giving the cooling air for said shaft a component of motion which is tangential to the shaft.

5. A gas turbine engine as claimed in claim 1 and in which said at least one aperture from said duct means is adjacent said outlet of said duct means to said turbine so that the shaft cooling air may cool substantially the whole length of said shaft.

6. A gas turbine engine as claimed in claim 1 and in which said at least one aperture from said duct means is part way along said duct means so that the cooling air for said shaft may cool only a forward part of said shaft, a remainder of said shaft being cooled by the first part of said main flow of the cooling air being discharged from said duct means.

7. A gas turbine engine as claimed in claim 1 and in which an inner casing of said combustion system and a further annular casing mounted inside said inner casing together define an annular duct which comprises said duct means.

8. A gas turbine engine as claimed in claim 1 and in which said outlet for said duct means terminates in swirl nozzles for swirling said cooling air prior to the cooling air entering to said turbine.

9. A gas turbine engine as claimed in claim 1 and in which there are a plurality of compressors, a corresponding plurality of turbines, and a corresponding plurality of shafts each of which connects one said compressor to its respective turbine, the shaft cooling air acting only on the shaft connecting the highest pressure compressor to the highest pressure turbine.

* * * * *